US012671818B2

(12) United States Patent
Zhang et al.

(10) Patent No.: US 12,671,818 B2
(45) Date of Patent: Jun. 30, 2026

(54) VIDEO PROCESSING METHOD, DEVICE, EQUIPMENT AND STORAGE MEDIUM

(71) Applicant: University of Chinese Academy of Sciences, Beijing (CN)

(72) Inventors: Xinfeng Zhang, Beijing (CN); Lv Tang, Beijing (CN)

(73) Assignee: University of Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/931,107

(22) Filed: Oct. 30, 2024

(65) Prior Publication Data

US 2026/0046417 A1    Feb. 12, 2026

(30) Foreign Application Priority Data

Aug. 7, 2024    (CN) .......................... 202411081581.6

(51) Int. Cl.
| | |
|---|---|
| *H04N 19/147* | (2014.01) |
| *H04N 19/119* | (2014.01) |
| *H04N 19/14* | (2014.01) |
| *H04N 19/172* | (2014.01) |
| *H04N 19/176* | (2014.01) |
| *H04N 19/42* | (2014.01) |
| *H04N 19/463* | (2014.01) |

(52) U.S. Cl.
CPC ......... *H04N 19/147* (2014.11); *H04N 19/119* (2014.11); *H04N 19/14* (2014.11); *H04N 19/172* (2014.11); *H04N 19/176* (2014.11); *H04N 19/42* (2014.11); *H04N 19/463* (2014.11)

(58) Field of Classification Search
CPC ..................................................... H04N 19/147
USPC ........................................ 375/240.01–240.29
See application file for complete search history.

(56) References Cited

U.S. PATENT DOCUMENTS

| | | | | |
|---|---|---|---|---|
| 12,210,976 | B2 * | 1/2025 | Liu ...................... | G06V 10/751 |
| 2017/0083829 | A1 * | 3/2017 | Kang ..................... | G06N 3/045 |
| 2017/0132528 | A1 * | 5/2017 | Aslan ..................... | G06N 20/00 |
| 2018/0158552 | A1 * | 6/2018 | Liu ........................... | G06N 3/08 |
| 2019/0325308 | A1 * | 10/2019 | Chung ................... | G06N 3/09 |
| 2020/0050846 | A1 * | 2/2020 | Sharma ................. | G06N 20/00 |
| 2020/0213587 | A1 * | 7/2020 | Galpin ................... | G06N 3/09 |

(Continued)

*Primary Examiner* — Leron Beck

(74) *Attorney, Agent, or Firm* — Bayramoglu Law Offices LLC

(57) ABSTRACT

A video processing method includes: dividing an original video sequence into a plurality of image blocks; inputting the plurality of image blocks into an encoding network model to obtain implicit representation video parameters corresponding to the original video sequence; inputting the implicit representation video parameters into a reconstruction network model to obtain a reconstructed video sequence corresponding to the original video sequence; calculating a loss function value based on the original video sequence and the reconstructed video sequence; based on the loss function value, adjusting the implicit representation video parameters until they meet preset requirements, and obtaining target implicit representation video parameters. The method compresses the video sequence, and adjusts the parameters of the compressed implicit representation video by reconstructing the video sequence to fully consider the redundant information of the original video sequence and reduce the bitrate of the implicit representation video parameters.

12 Claims, 3 Drawing Sheets

(56)         References Cited

U.S. PATENT DOCUMENTS

| 2020/0244997 | A1* | 7/2020 | Galpin | H04N 19/82 |
| 2021/0056390 | A1* | 2/2021 | Chen | G06N 3/045 |
| 2021/0099710 | A1* | 4/2021 | Salehifar | G06N 3/0464 |
| 2022/0101112 | A1* | 3/2022 | Brown | G06N 3/0895 |
| 2022/0207875 | A1* | 6/2022 | Kopparapu | G06N 20/00 |
| 2022/0261593 | A1* | 8/2022 | Yu | G06F 18/214 |
| 2022/0284283 | A1* | 9/2022 | Yin | G06N 3/0464 |
| 2022/0292724 | A1* | 9/2022 | Ren | G06N 3/094 |
| 2022/0337852 | A1* | 10/2022 | Djelouah | G06N 3/047 |
| 2023/0023164 | A1* | 1/2023 | Parameswaran | G06V 10/7753 |
| 2023/0048206 | A1* | 2/2023 | Athreya | G06V 40/161 |
| 2023/0091667 | A1* | 3/2023 | Rao | G06N 3/0985 |
|  |  |  |  | 706/15 |

* cited by examiner

1

VIDEO PROCESSING METHOD, DEVICE, EQUIPMENT AND STORAGE MEDIUM

CROSS REFERENCE TO THE RELATED APPLICATIONS

This application is based upon and claims priority to Chinese Patent Application No. 202411081581.6, filed on Aug. 7, 2024, the entire contents of which are incorporated herein by reference.

TECHNOLOGY

The application belongs to the technical field of data processing, in particular to a video processing method, device, device and storage medium.

BACKGROUND

In the digital era, video data is ubiquitous, and effective storage and transmission of video data has become critical. With decades of technological progress, traditional hybrid video coding technologies such as H.264/AVC, H.265/HEVC and H.266/VVC, and video coding technology based on deep learning have been developed to further improve the efficiency of video coding.

Whether traditional hybrid coding technology or deep learning based method, their main purpose is to eliminate redundancy in video. These technologies, through design, realize the use of block to block or frame to frame processing methods to remove time redundancy, which limits the performance of the algorithm, resulting in further improvement of video compression effect and bitrate.

SUMMARY

The application provides a video processing method, device, equipment and storage medium, which can solve the technical problem that the video compression effect and bitrate are not ideal.

The embodiment of the first aspect of the application proposes a video processing method, including:

Divide the original video sequence to obtain multiple image blocks;

Inputting the plurality of image blocks into the encoding network model to obtain the corresponding implicit representation video parameters of the original video sequence, and the implicit representation video parameters are abstract representations of the original video sequence;

Inputting the implicit representation video parameters into the reconstruction network model to obtain the reconstructed video sequence corresponding to the original video sequence;

Calculating the loss function value based on the original video sequence and the reconstructed video sequence;

Based on the loss function value, adjust the implicit representation video parameters until the implicit representation video parameters meet preset requirements, and obtain the target implicit representation video parameters.

The embodiment of the second aspect of the application provides a video processing device, including:

A partitioning module for partitioning the original video sequence to obtain a plurality of image blocks;

An input module for inputting the plurality of image blocks into the encoding network model to obtain the implicit representation video parameters corresponding to the original video sequence, and the implicit representation video parameters are abstract representations of the original video sequence;

The input module is also used to input the implicit representation video parameters into the reconstruction network model to obtain the reconstructed video sequence corresponding to the original video sequence;

A calculation module for calculating a loss function value based on the original video sequence and the reconstructed video sequence;

The adjustment module is used to adjust the implicit representation video parameters based on the loss function value until the implicit representation video parameters meet the preset requirements to obtain the target implicit representation video parameters.

The embodiment of the third aspect of the application provides an electronic device, including a memory, a processor, and a computer program stored on the memory and capable of running on the processor. The processor runs the computer program to implement the method described in the first aspect.

The embodiment of the fourth aspect of the present application provides a computer-readable storage medium, on which a computer program is stored, and the program is executed by a processor to realize the method described in the first aspect.

The technical solution provided in the embodiment of the application has at least the following technical effects or advantages:

The application provides a video processing method, device, device and storage medium, which includes: dividing the original video sequence to obtain a plurality of image blocks; Input multiple image blocks into the encoding network model to obtain the corresponding implicit representation video parameters of the original video sequence; The implicit representation video parameters are input into the reconstruction network model to obtain the reconstructed video sequence corresponding to the original video sequence; The loss function value is calculated based on the original video sequence and the reconstructed video sequence; Based on the loss function value, adjust the implicit representation video parameters until the implicit representation video parameters meet the preset requirements, and obtain the target implicit representation video parameters. The embodiment of the application compresses the video sequence by encoding the whole video sequence, and adjusts the compressed implicit representation video parameters by reconstructing the video sequence, so as to fully consider the redundant information of the original video sequence as a whole, and reduce the bitrate of the implicit representation video parameters.

Additional aspects and advantages of the application will be given in the following description, and some will become obvious from the following description, or learned from the practice of the application.

BRIEF DESCRIPTION OF THE DRAWINGS

By reading the detailed description of the preferred embodiments below, various other advantages and benefits will become clear to those skilled in the art. The drawings are only for the purpose of showing the preferred embodiment, and are not considered as a limitation of the present application. And throughout the drawings, the same components are represented by the same reference symbols. In the attached figure.

DETAILED DESCRIPTION OF THE EMBODIMENTS

Figure 1:
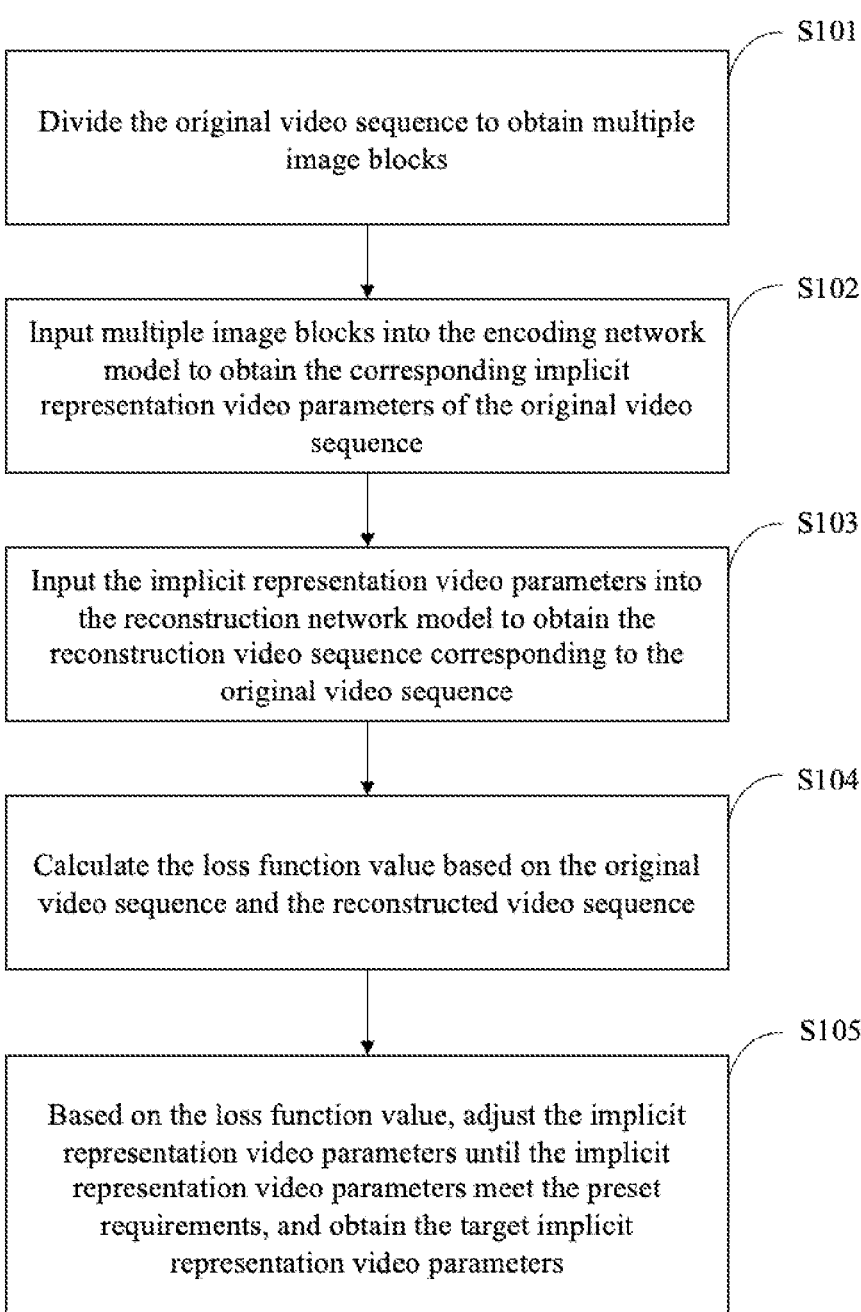
FIG. 1 shows the flow chart of a video processing method provided by an embodiment of the application.

The exemplary embodiments of the present application will be described in more detail below with reference to the accompanying drawings. Although the exemplary embodiments of the application are shown in the drawings, it should be understood that the application can be implemented in various forms and should not be limited by the embodiments described herein. On the contrary, these embodiments are provided in order to have a more thorough understanding of the application and to be able to completely convey the scope of the application to those skilled in the art.

It should be noted that, unless otherwise specified, the technical terms or scientific terms used in the application should have a common meaning understood by those skilled in the art to which the application belongs.

The video processing method of the application can be executed by computing devices, which can be servers, such as one server, multiple servers, server clusters, cloud computing platforms, etc. Optionally, computing devices can also be terminal devices, such as mobile phones, tablet computers, game consoles, portable computers, desktops, advertising machines, all-in-one computers, etc. The application does not limit the type and number of computing devices The application provides a video processing method, device and storage medium, which includes: dividing the original video sequence to obtain a plurality of image blocks; Input multiple image blocks into the encoding network model to obtain the corresponding implicit representation video parameters of the original video sequence; The implicit representation video parameters are input into the reconstruction network model to obtain the reconstructed video sequence corresponding to the original video sequence; The loss function value is calculated based on the original video sequence and the reconstructed video sequence; Based on the loss function value, adjust the implicit representation video parameters until the implicit representation video parameters meet the preset requirements, and obtain the target implicit representation video parameters. The embodiment of the application compresses the video sequence by encoding the whole video sequence, and adjusts the compressed implicit representation video parameters by reconstructing the video sequence, so as to fully consider the redundant information of the original video sequence as a whole, and reduce the bitrate of the implicit representation video parameters.

A video processing method proposed according to the embodiment of the present application is described below in combination with the accompanying drawings.

Refer to FIG. 1. This method includes the following steps:

S101: The original video sequence is divided into several image blocks.

The original video sequence can be obtained from the video capture device or storage medium. For example, you can obtain the original video sequence through real-time video recording, download the original video sequence from the video sharing platform on the Internet, video website or other online services, import from storage media, and so on.

In some embodiments, the original video sequence can be divided based on time, for example, the original video sequence can be divided into multiple clips at a fixed time interval, and the original video sequence can be divided based on video frames, for example, the video can be divided into a fixed number of frames of clips, and the original video sequence can be divided based on video content, such as detecting changes in the scene in the video or switching to segmentation, usually based on changes in color, luminosity or motion information.

It should be noted that the original video sequence can also be segmented from other perspectives, so it will not be repeated here.

S102: Multiple image blocks are input into the encoding network model, and the corresponding implicit representation video parameters of the original video sequence are obtained.

The implicit representation of video parameters is an abstract representation of the original video sequence.

Implicit representation of video parameters is a low dimensional, abstract representation of video data through some way. That is, the implicit representation video parameters are compressed representations of the original video sequence, which can effectively provide a compact representation of video data. This representation does not directly correspond to the original pixel value of the video, but is obtained through a specific encoding process. It usually has the following characteristics:

Low dimension: Implicitly, video parameters are usually lower than the dimensions of the original video data, which means that they can reduce storage and processing costs while retaining key information.

Semantic richness: Implicitly indicates that video parameters capture high-level semantic or structural information in the video, which may be very useful for understanding video content or performing specific video analysis tasks (such as action recognition and event detection).

Continuity: The implicit representation video parameters are usually continuous, and similar video clips in the representation space should also be adjacent in the space, which makes interpolation or compensation in the implicit space more effective.

In some embodiments, the process of encoding multiple image blocks to implicitly represent video parameters can be implemented as follows:

Extract the image features corresponding to multiple image blocks, fuse multiple image features, and use the encoder to map the fused image features to the low dimensional implicit space representation, that is, encode the video parameters into the implicit representation.

Among them, image features can include spatial features and temporal features. The convolutional neural network and other technologies can be used to extract the corresponding spatial features of multiple space blocks. The spatial features can be information about image content, such as edge, color, texture, etc. The cyclic neural network, short-term memory network, convolutional network and time information technology can be used to extract the corresponding temporal features of multiple space blocks. The movement and change of objects in the video can be captured by analyzing the temporal features. By fusing the corresponding spatial and temporal features of multiple space blocks, as well as the image features of multiple space blocks, the final implicit representation video parameters can better represent the content and dynamics of the entire original video sequence.

S103: The implicit representation video parameters are input into the reconstruction network model to obtain the reconstructed video sequence corresponding to the original video sequence.

S104: The loss function value is calculated based on the original video sequence and the reconstructed video sequence.

S105: Based on the loss function value, adjust the implicit representation video parameters until the implicit representation video parameters meet the preset requirements, and obtain the target implicit representation video parameters.

In some embodiments, based on the loss function value, adjust the implicit representation video parameters, continue training until the preset training completion conditions are met, and obtain the target implicit representation video parameters, including: in each iteration process, calculate the rate distortion corresponding to the implicit representation video parameters;

When the rate distortion is less than the rate distortion threshold, continue training until the rate distortion corresponding to the implicit representation video parameter is greater than or equal to the rate distortion threshold or the training times reach the training times threshold to obtain the target implicit representation video parameter.

The reconstruction network model includes a decoder network, which can be used to decode the implicit representation video parameters back to the original video sequence.

Since the reconstructed video sequence is obtained based on the implicit representation video parameters, the difference between the reconstructed video sequence and the original video sequence can be considered as the difference between the implicit representation video parameters and the original video sequence. Therefore, the loss function value can be calculated based on the original video sequence and the reconstructed video sequence, and the network parameters of the encoding network model can be adjusted based on the loss function value to adjust the implicit representation video parameters.

The preset requirement can be to implicitly indicate that the rate distortion corresponding to the video parameters is within the preset rate distortion range, and implicitly indicate that the rate distortion corresponding to the video parameters describes how to balance and optimize the coding rate and distortion during video compression. The coding rate refers to the amount of data transmitted or processed in unit time, usually expressed in bitrate (bps). In multimedia coding, the bitrate directly determines the transmission rate and quality of data streams. A higher bitrate usually means higher data quality, because more information can be transmitted and saved, but it also means that more bandwidth is needed to support transmission. Distortion refers to the loss of information or quality during compression.

The loss function value can include block level loss, global loss and timing loss. The block level loss can be calculated based on the content difference information corresponding to multiple image blocks in the original video sequence and the reconstructed video sequence, the global loss can be calculated based on the content difference information of the original video sequence and the reconstructed video sequence, and the timing loss can be calculated based on the timing difference information of the original video sequence and the reconstructed video sequence.

Further set the weights corresponding to the block level loss, global loss and timing loss, and calculate the loss function value of the encoding network model based on the block level loss, global loss and timing loss and the weights corresponding to the block level loss, global loss and timing loss.

Therefore, the corresponding rate distortion can be further adjusted by adjusting the implicit representation video parameters to balance the compression quality and transmission quality in the video compression process.

This application proposes a video processing method, which includes: dividing the original video sequence to obtain a plurality of image blocks; Input multiple image blocks into the encoding network model to obtain the corresponding implicit representation video parameters of the original video sequence; The implicit representation video parameters are input into the reconstruction network model to obtain the reconstructed video sequence corresponding to the original video sequence; The loss function value is calculated based on the original video sequence and the reconstructed video sequence; Based on the loss function value, adjust the implicit representation video parameters until the implicit representation video parameters meet the preset requirements, and obtain the target implicit representation video parameters. The embodiment of the application compresses the video sequence by encoding the whole video sequence to fuse the image features corresponding to each frame in the original video sequence to better represent the content and dynamics of the entire video sequence, and adjusts the parameters of the compressed implicit video by reconstructing the video sequence to meet the corresponding rate distortion requirements, so as to balance the compression quality and transmission quality in the video compression process.

In some embodiments, before multiple image blocks are input into the encoding network model to obtain the implicit representation video parameters corresponding to the original video sequence, including: determining the model structure of the encoding network model according to the sequence characteristics corresponding to the original video sequence and/or the first performance corresponding to the encoding network model.

Among them, sequence characteristics can include temporal and spatial correlation, frame rate, resolution, color and color space, motion characteristics, coding format, scene change and content complexity.

The first performance can be the bitrate of the encoding network model or the number of some network layers of the encoding network model.

Because the bitrate corresponding to the encoding network model is related to the structure of the encoding network model, specifically, the number of middle layers of the encoding network model is related to the bitrate corresponding to the encoding network model.

Therefore, the model structure of the encoding network model can be determined by combining the sequence characteristics corresponding to the original video sequence and/or the bitrate corresponding to the encoding network model.

In some embodiments, the model structure of the encoding network model is determined according to the sequence characteristics corresponding to the original video sequence and/or the first performance of the encoding network model, including: determining the number of middle layers of the first middle layer of the encoding network model and the measured bitrate corresponding to the encoding network model under the middle layer; If the measured bitrate is less than the minimum threshold of the preset bitrate range, increase the number of the first intermediate layer until the measured bitrate falls into the preset bitrate range; If the measured bitrate is greater than the maximum threshold value of the preset bitrate range, reduce the number of the first intermediate layer until the measured bitrate falls into the preset bitrate range.

Among them, the first intermediate layer can be an intermediate layer for transformation and quantization. The role of the intermediate layer is mainly to affect the coding efficiency and bitrate. The transformation method used by the intermediate layer includes discrete cosine transform, which can convert the spatial domain data of video frames into frequency domain representation. The transformed frequency domain coefficients are quantized, that is, according to the preset quantization step, the continuous coefficient values are rounded to discrete levels. The fineness of quantization directly affects the amount of encoded data, thus affecting the final bitrate. A lower quantization step size will produce more details, but will also increase the amount of data, resulting in a higher bitrate; The higher quantization step size reduces the details but reduces the bitrate.

Since the number of the first intermediate layer is related to the bitrate, the more the number is, the higher the bitrate is. However, the number of more intermediate layers will lead to insufficient processing capacity and memory of the encoding network model. Therefore, the bitrate range needs to be set to balance the compression quality, processing capacity and memory.

The preset bitrate range can be flexibly set based on the actual situation, and will not be repeated here.

If the measured bitrate is less than the minimum threshold of the preset rate range, the compression quality is not high. Therefore, the number of the first intermediate layer can be increased to improve the measured bitrate of the encoding network model to improve the compression quality; If the measured bitrate is greater than the minimum threshold value of the preset bitrate range, it indicates that the compression quality is OK, but the number of first intermediate layers used is relatively large, which will lead to insufficient processing capacity and memory of the encoding network model. Therefore, the number of first intermediate layers can be reduced until the measured bitrate falls into the preset bitrate range.

After obtaining the implicit representation video parameters corresponding to the original video sequence, in order to further reduce the size of data representation and thus reduce storage or transmission costs, the implicit representation video parameters can also be entropy coded. Common entropy coding technologies include context adaptive binary arithmetic coding and context adaptive binary arithmetic coding. They dynamically adjust the coding table according to the frequency distribution of data to improve coding efficiency and reduce the overall bitrate.

In some embodiments, the model structure of the encoding network model is determined according to the sequence characteristics corresponding to the original video sequence and/or the first performance of the encoding network model, including: determining at least one adjacent frame in the original video sequence whose frame difference value is greater than the frame difference threshold; Add corresponding learning parameters to the network layer corresponding to at least one adjacent frame.

Among them, learning parameters usually refer to the parameters in the model that can be adjusted and optimized through the training process, which can speed up the training process.

It can be understood that for at least one adjacent frame with a small frame difference value, the traditional fixed parameter setting can effectively learn the content of at least one adjacent frame to complete coding, but for at least one adjacent frame with a large frame difference value, the traditional fixed parameter setting may not be able to effectively meet the needs of different scenes. Therefore, corresponding learning parameters can be added to the network layer corresponding to at least one adjacent frame. By adding learning parameters, the encoder can dynamically adjust parameters during the coding process to optimize the compression rate and maintain video quality. This dynamic adjustment can be optimized according to inter frame correlation, motion estimation error and other factors to improve visual quality.

In some embodiments, before the implicit representation video parameters are input into the reconstruction network model and the reconstructed video sequence corresponding to the original video sequence is obtained, the method also includes: determining the model structure of the reconstruction network model according to the video information corresponding to a plurality of image blocks and/or the second performance corresponding to the reconstruction network model.

Among them, video information includes first-order edge information and second-order curvature information, among which, first-order edge information can help detect edges or contours in images by calculating gradients, which is very useful for object detection, motion estimation and other tasks. Second order curvature information is usually used in image processing for edge thinning, feature point extraction and other tasks. It can help further analyze the local characteristics of pixel intensity changes in images and provide more abundant image description information.

The second performance can be the reconstruction performance of the reconstruction network model, which can be expressed in terms of mean square error, peak signal to noise ratio, structure similarity index, etc.

Determining the model structure based on the video information and reconstruction performance of the original video sequence can make the reconstructed video sequence reconstructed by the model structure have better reconstruction performance.

In some embodiments, according to the video information corresponding to multiple image blocks and/or the second performance corresponding to the reconstruction network model, determine the model structure of the reconstruction network model, including:

Add the second middle layer group of the reconstructed network model. Each second middle layer group is used to execute the iterative process and the input of each second middle layer group is consistent; And/or, deepening at least one third middle layer of the reconstructed network model; And/or widening and reconstructing at least one fourth middle layer of the network model; The first order edge information and second order curvature information corresponding to multiple image blocks are calculated, and the first order edge information and second order curvature information corresponding to multiple image blocks are added to the corresponding network layer of multiple image blocks.

Among them, the second intermediate layer group can introduce additional processing layers into each training iteration, which can be used for multiple iterations in one training.

The application process of the second M-server group can be implemented as follows:

Iterative training: in each training step, not only a single forward propagation and back propagation are used, but additional iterative steps are introduced. This can include multiple repetition of forward propagation and backward propagation to increase the effect of gradient descent or enhance the stability of parameter update. Or, Increase iterative optimization: introduce more complex optimization process in the training process, such as adding additional iterative steps or constraints to the loss function. These additional iterations can help the model better explore the parameter space or adjust the complexity of the model to improve the final performance.

perhaps

Multi stage training: divide the training process into multiple stages, and introduce different intermediate processing layers or processing steps in each stage. Each stage can focus on different goals or adjust different network parts to gradually improve the overall performance.

perhaps

Adaptive iteration: dynamically adjust the intermediate layers or steps in the iteration process according to the current state of the model or the training progress. For example, adjust the number of iterations in the training process or introduce additional middle layers according to the performance of the verification set to optimize the convergence speed or performance in the training process.

The second middle layer, the third middle layer and the fourth middle layer play the same role, but the middle layer that is deepened or widened can be the same middle layer or different middle layers.

Among them, the deepening operation can include deepening some network layers in the implicit representation network, or deepening the network module composed of several network layers and other operations. After the deepening operation, the output of the previous deepening network layer or network module is the input of the next deepening network layer or network module. The widening operation can include operations such as widening to implicitly represent some network layers in the network, or widening the network module composed of several network layers. After the widening operation, the current input characteristics are sent into the widened network layer or network module in parallel, and then these network layers or network modules output for the addition operation.

In the same reconstruction network model, you can simultaneously add the second middle layer group of the reconstruction network model, deepen the third middle layer, and widen the fourth middle layer. You can also perform any two of the above three operations at the same time, or perform only one of the above three operations at a time point.

It can be understood that the reconstruction network model stores more first-order edge information and second-order curvature information of the original video sequence, and the model has a stronger ability to understand the spatial structure and shape of the original video sequence.

Therefore, the first-order edge information and second-order curvature information corresponding to multiple image blocks can be added to the corresponding network layer of multiple image blocks.

Figure 2:
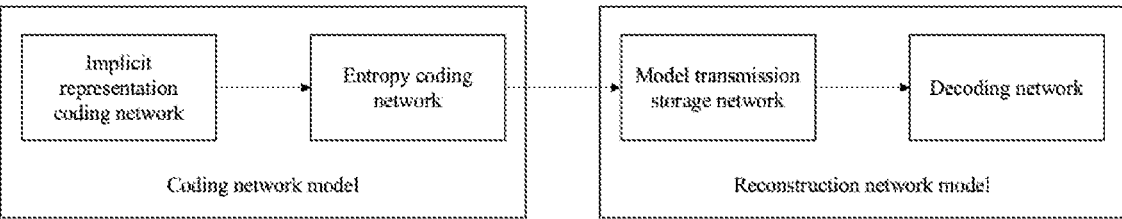
FIG. 2 shows the structural diagram of an implicit representation network model provided by an embodiment of the application.

Among them, a section of edge information can be calculated by Sobel operator, Canny edge detection and Laplacian operator, and second-order curvature information can be obtained by curvature calculation, normal vector and curvature calculation After the encoding network model and the model structure of the reconstruction network model are determined, the implicit representation network model can be constructed based on the encoding network model and the reconstruction network model. The model structure of the implicit network model is shown in FIG. 2. The implicit network model includes the encoding network model and the reconstruction network model. The encoding network model includes the implicit encoding network and the entropy encoding network. The reconstruction network model includes the model transmission storage network and the video decoding network.

The implicit representation coding network can encode the original video sequence into implicit representation video parameters. The entropy coding network dynamically adjusts the coding table according to the frequency distribution of the data through the entropy coding technology to obtain the entropy coding parameters. Further, the reconstruction network model can obtain the reconstructed video sequence by sequencing and transmitting the entropy coding parameters, and decoding the entropy coding parameters using the decoding network.

After the encoding network model training is completed, the implicit representation video parameters corresponding to the original video sequence are stored in the implicit representation network model. The index information corresponding to the implicit representation video parameters can be input into the implicit representation network model to output the corresponding reconstruction video clips. The index information can be the content information in the video, the time information in the video, such as the index information can be the 1-10 seconds of the video, the video clips related to the big tree, and so on.

Figure 3:
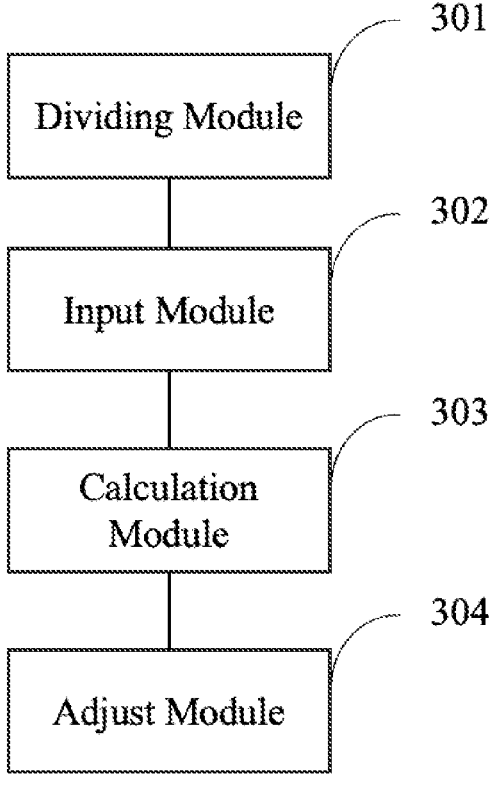
FIG. 3 shows the structural diagram of a video processing device provided by an embodiment of the application.
Figure 4:
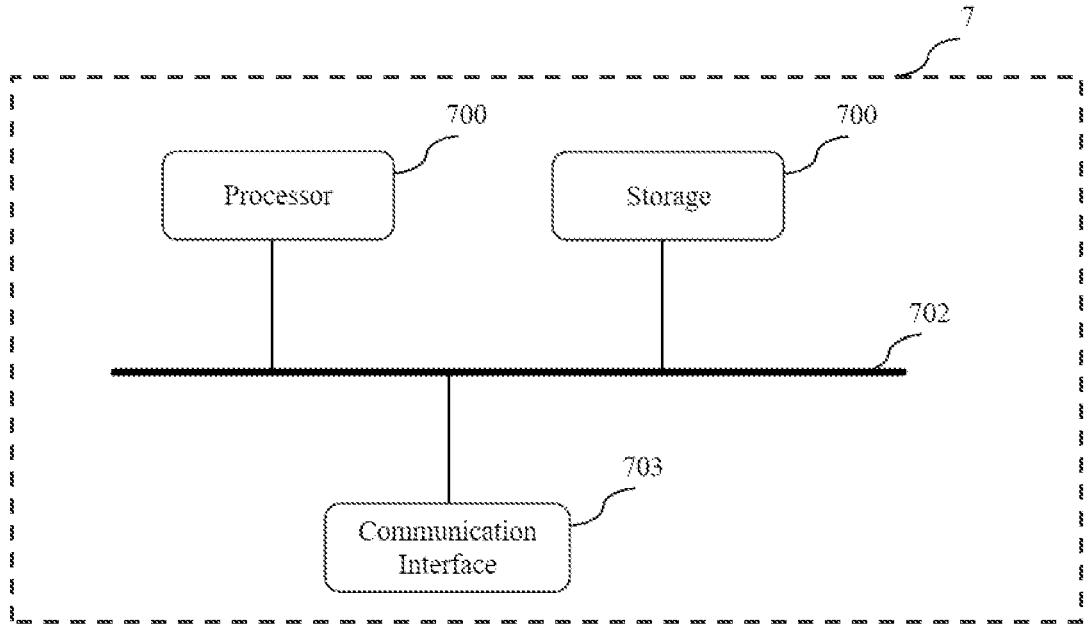
FIG. 4 shows the structural diagram of an electronic device provided by an embodiment of the application.
Figure 5:
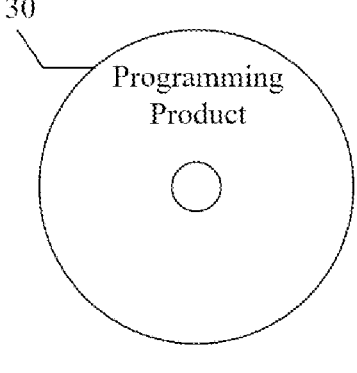
FIG. 5 shows a schematic diagram of a storage medium provided by an embodiment of the application.

The embodiment of the application also provides a video processing device, which is used to execute the video processing method provided by any of the above embodiments. As shown in FIG. 3, the device includes a partition module 301, an input module 302, a calculation module 303, and an adjustment module 304.

A partitioning module 301 for partitioning the original video sequence to obtain a plurality of image blocks;

An input module 302 for inputting the plurality of image blocks into the encoding network model to obtain the implicit representation video parameters corresponding to the original video sequence, and the implicit representation video parameters are abstract representations of the original video sequence;

The input module 302 is also used to input the implicit representation video parameters into the reconstruction network model to obtain the reconstructed video sequence corresponding to the original video sequence;

A calculation module 303 for calculating a loss function value based on the original video sequence and the reconstructed video sequence;

The adjustment module 304 is used to adjust the implicit representation video parameters based on the loss function value until the implicit representation video parameters meet the preset requirements to obtain the target implicit representation video parameters.

The embodiment of the application provides a video processing device, which includes: dividing the original video sequence to obtain a plurality of image blocks; Input multiple image blocks into the encoding network model to obtain the corresponding implicit representation video parameters of the original video sequence; The implicit representation video parameters are input into the reconstruction network model to obtain the reconstructed video sequence corresponding to the original video sequence; The loss function value is calculated based on the original video sequence and the reconstructed video sequence; Based on the loss function value, adjust the implicit representation video parameters until the implicit representation video parameters meet the preset requirements, and obtain the target implicit representation video parameters. The embodiment of the application compresses the video sequence by encoding the whole video sequence, and adjusts the compressed implicit representation video parameters by reconstructing the video sequence, so as to fully consider the redundant information of the original video sequence as a whole, and reduce the bitrate of the implicit representation video parameters.

In some embodiments, the above device also includes a determination module for determining the model structure of the encoding network model according to the sequence characteristics corresponding to the original video sequence and/or the first performance corresponding to the encoding network model.

In some embodiments, the determination module is specifically used for:

Determining the number of intermediate layers of the first intermediate layer of the encoding network model and the measured bitrate corresponding to the encoding network model under the intermediate layer;

When the measured bitrate is less than the minimum threshold value of the preset bitrate range, increase the number of the first intermediate layer until the measured bitrate falls into the preset bitrate range;

If the measured bitrate is greater than the maximum threshold value of the preset bitrate range, reduce the number of the first intermediate layer until the measured bitrate falls into the preset bitrate range.

In some embodiments, the determination module is also specifically used for:

Determining at least one adjacent frame in the original video sequence whose frame difference value is greater than the frame difference threshold;

Add corresponding learning parameters to the network layer corresponding to the at least one adjacent frame.

In some embodiments, the determination module is also used to:

The model structure of the reconstruction network model is determined according to the video information corresponding to the multiple image blocks and/or the second performance corresponding to the reconstruction network model.

In some embodiments, the determination module is also specifically used for:

Add the second middle layer group of the reconstructed network model, each second middle layer group is used to execute the iterative process, and the input of each second middle layer group is consistent;

And/or deepening at least one third intermediate layer of the reconstructed network model;

And/or widening at least one fourth intermediate layer of the reconstructed network model;

The first order edge information and the second order curvature information corresponding to the multiple image blocks are calculated, and the first order edge information and the second order curvature information corresponding to the multiple image blocks are added to the network layer corresponding to the multiple image blocks.

In some embodiments, the adjustment module is specifically used for:

In each iteration process, calculate the rate distortion corresponding to the implicit representation video parameters;

When the rate distortion is less than the rate distortion threshold, continue training until the rate distortion corresponding to the implicit representation video parameter is greater than or equal to the rate distortion threshold or the training times reach the training times threshold to obtain the target implicit representation video parameter.

The embodiment of the application also provides an electronic device to execute the above video processing method. Please refer to FIG. 10, which shows the schematic diagram of an electronic device provided by some embodiments of the application. As shown in FIG. 10, electronic device 7 includes: processor 700, memory 701, bus 702 and communication interface 703, processor 700, communication interface 703 and memory 701 are connected through bus 702; The memory 701 stores a computer program that can be run on the processor 700, and the processor 700 executes the video processing method provided by any of the preceding embodiments of the present application when running the computer program.

The memory 701 may include high-speed random access memory (RAM), and may also include non volatile memory, such as at least one disk memory. The communication connection between the device network element and at least one other network element is realized through at least one communication interface 703 (which can be wired or wireless), and the Internet, WAN, local area network, metropolitan area network, etc. can be used.

The bus 702 can be an ISA bus, a PCI bus, an EISA bus, or the like. The bus can be divided into address bus, data bus, control bus, etc. The memory 701 is used to store programs, and the processor 700 executes programs after receiving execution instructions. The video processing method disclosed in any of the embodiments of the above application can be applied to the processor 700, or implemented by the processor 700.

The processor 700 may be an integrated circuit chip with signal processing capability. In the implementation process, each step of the above method can be completed by the integrated logic circuit of hardware or instructions in the form of software in the processor 700. The processor 700 can be a general processor, including a central processing unit (CPU), a network processor (NP), etc; It can also be digital signal processor (DSP), application specific integrated circuit (ASIC), off the shelf programmable gate array (FPGA) or other programmable logic devices, discrete gates or transistor logic devices, and discrete hardware components. Each method, step and logic block diagram disclosed in the embodiment of the application can be realized or executed. The general processor can be a microprocessor or the processor can also be any conventional processor, etc.

The steps of the method disclosed in combination with the embodiments of the present application can be directly reflected in the completion of the hardware decoding processor or the combination of hardware and software modules in the decoding processor. The software module can be located in random access memory, flash memory, read-only memory, programmable read-only memory or electrically erasable programmable memory, register and other mature storage media in the field. The storage medium is located in the memory 701, and the processor 700 reads the information in the memory 701 and completes the steps of the above method in combination with its hardware.

The electronic device provided by the embodiment of the application is based on the same inventive concept as the video processing method provided by the embodiment of the application, and has the same beneficial effect as the method adopted, operated or realized.

The embodiment of the present application also provides a computer-readable storage medium corresponding to the video processing method provided by the aforementioned embodiment. Please refer to FIG. 11. The computer-readable storage medium shown in the embodiment is an optical disc 30, on which a computer program (i.e. a program product) is stored. When a computer program is run by a processor, it will execute the video processing method provided by any of the aforementioned embodiments.

It should be noted that examples of computer-readable storage media can also include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other optical and magnetic storage media.

The computer-readable storage medium provided by the above embodiments of the application is based on the same inventive concept as the video processing method provided by the embodiments of the application, and has the same beneficial effect as the method adopted, run or implemented by the stored application program.

Note:

In the instructions provided here, a lot of specific details are explained. However, it can be understood that the embodiments of the present application can be practiced without these specific details. In some examples, the well-known structure and technology are not shown in detail, so as not to obscure the understanding of this specification.

In addition, those skilled in the art can understand that although some embodiments herein include some features included in other embodiments rather than other features, the combination of features of different embodiments means that they are within the scope of the application and form different embodiments. For example, in the following claims, any one of the embodiments claimed can be used in any combination.

The above is only the preferred specific implementation mode of the application, but the protection scope of the application is not limited to this. Any change or replacement that can easily be thought of by any skilled person familiar with the technical field within the technical scope disclosed in the application should be included in the protection scope of the application. Therefore, the protection scope of the application shall be subject to the protection scope of the claims.

What is claimed is:

1. A video processing method, comprising:

dividing an original video sequence into a plurality of image blocks;

inputting the plurality of image blocks into an encoding network model to obtain implicit representation video parameters corresponding to the original video sequence, wherein the implicit representation video parameters are abstract representations of the original video sequence, the implicit representation video parameters are compressed representations of the original video sequence;

inputting the implicit representation video parameters into a reconstruction network model to obtain a reconstructed video sequence corresponding to the original video sequence;

calculating a loss function value based on the original video sequence and the reconstructed video sequence; and based on the loss function value, the network parameters of the encoding network model be adjusted to adjust the implicit representation video parameters until the implicit representation video parameters meet preset requirements, and obtaining target implicit representation video parameters;

wherein before inputting the plurality of image blocks into the encoding network model to obtain the implicit representation video parameters corresponding to the original video sequence, the video processing method further comprises:

determining a model structure of the encoding network model based on sequence characteristics corresponding to the original video sequence or a first performance corresponding to the encoding network model or the original video sequence and a first performance corresponding to the encoding network model;

wherein the step of determining the model structure of the encoding network model based on the sequence characteristics corresponding to the original video sequence or the first performance of the encoding network model or the original video sequence and a first performance corresponding to the encoding network model comprises:

determining a number of first intermediate layers of the encoding network model and a measured bitrate of the encoding network model in the first intermediate layers;

when the measured bitrate is less than a minimum threshold of a preset bitrate range, increasing the number of first intermediate layers until the measured bitrate falls within the preset bitrate range; and when the measured bitrate is greater than a maximum threshold of the preset bitrate range, reducing the number of first intermediate layers until the measured bitrate falls within the preset bitrate range;

wherein the video processing method adjusts the implicit representation video parameters based on the loss function value, continues training until preset training completion conditions are met, and obtains the target implicit representation video parameters, comprising:

in each iteration process, calculating a rate distortion corresponding to the implicit representation video parameters; and when the rate distortion is less than a rate distortion threshold, continuing training until the rate distortion corresponding to the implicit representation video parameters is greater than or equal to the rate distortion threshold or training times reach a training times threshold to obtain the target implicit representation video parameters;

the process of encoding multiple image blocks to implicitly represent video parameters be implemented as follows:

extract the image features corresponding to multiple image blocks, fuse multiple image features, and use the encoder to map the fused image features to the low dimensional implicit space representation, that is, encode the video parameters into the implicit representation;

image features include spatial features and temporal features; convolutional neural network be used to extract the spatial features.

2. The video processing method according to claim 1, wherein the step of determining the model structure of the encoding network model based on the sequence characteristics corresponding to the original video sequence or the first performance of the encoding network model or the original video sequence and a first performance corresponding to the encoding network model comprises:

determining at least one adjacent frame in the original video sequence with a frame difference value greater than a frame difference threshold; and adding learning parameters in a network layer corresponding to the at least one adjacent frame.

3. The video processing method according to claim 1, wherein before inputting the implicit representation video parameters into the reconstruction network model to obtain the reconstructed video sequence corresponding to the original video sequence, the video processing method further comprises:

determining a model structure of the reconstruction network model based on video information corresponding to each of the plurality of image blocks or based on a second performance corresponding to the reconstruction network model or based on video information corresponding to each of the plurality of image blocks and a second performance corresponding to the reconstruction network model.

4. The video processing method according to claim 1, wherein a model structure of the reconstruction network model is determined based on video information corresponding to each of the plurality of image blocks and/or a second performance corresponding to the reconstruction network model by:

adding a second middle layer group of the reconstructed network model, wherein the second middle layer group is used to execute an iterative process, and an input of the second middle layer group is consistent;

or deepening at least one third intermediate layer of the reconstructed network model;

or widening at least one fourth intermediate layer of the reconstructed network model;

or adding a second middle layer group of the reconstructed network model, wherein the second middle layer group is used to execute an iterative process, and an input of the second middle layer group is consistent; and deepening at least one third intermediate layer of the reconstructed network model;

or adding a second middle layer group of the reconstructed network model, wherein the second middle layer group is used to execute an iterative process, and an input of the second middle layer group is consistent;

and widening at least one fourth intermediate layer of the reconstructed network model;

or deepening at least one third intermediate layer of the reconstructed network model; and widening at least one fourth intermediate layer of the reconstructed network model;

or adding a second middle layer group of the reconstructed network model, wherein the second middle layer group is used to execute an iterative process, and an input of the second middle layer group is consistent; and deepening at least one third intermediate layer of the reconstructed network model; and widening at least one fourth intermediate layer of the reconstructed network model; and calculating first order edge information and second order curvature information corresponding to the plurality of image blocks, and adding the first order edge information and the second order curvature information corresponding to the plurality of image blocks to a network layer corresponding to the plurality of image blocks.

5. A video processing device, comprising:

a partitioning module, configured for partitioning an original video sequence to obtain a plurality of image blocks;

an input module, configured for:

inputting the plurality of image blocks into an encoding network model to obtain implicit representation video parameters corresponding to the original video sequence, wherein the implicit representation video parameters are abstract representations of the original video sequence, the implicit representation video parameters are compressed representations of the original video sequence; and inputting the implicit representation video parameters into a reconstruction network model to obtain a reconstructed video sequence corresponding to the original video sequence;

a calculation module, configured for calculating a loss function value based on the original video sequence and the reconstructed video sequence; and an adjustment module, configured for adjusting the network parameters of the encoding network model to adjusted the implicit representation video parameters based on the loss function value until the implicit representation video parameters meet preset requirements to obtain target implicit representation video parameters;

wherein the video processing method adjusts the implicit representation video parameters based on the loss function value, continues training until preset training completion conditions are met, and obtains the target implicit representation video parameters, comprising:

in each iteration process, calculating a rate distortion corresponding to the implicit representation video parameters; and when the rate distortion is less than a rate distortion threshold, continuing training until the rate distortion corresponding to the implicit representation video parameters is greater than or equal to the rate distortion threshold or training times reach a training times threshold to obtain the target implicit representation video parameters;

the process of encoding multiple image blocks to implicitly represent video parameters be implemented as follows:

extract the image features corresponding to multiple image blocks, fuse multiple image features, and use the encoder to map the fused image features to the low dimensional implicit space representation, that is, encode the video parameters into the implicit representation;

image features include spatial features and temporal features; convolutional neural network be used to extract the spatial features.

6. An electronic device, comprising a memory, bus and communication interface, a processor and a computer program stored on the memory and configured to run on the processor, wherein the processor runs the computer program to realize the video processing method according to claim 1; processor, communication interface and memory are connected through bus, the memory include non volatile memory.

7. A computer-readable storage medium, wherein a computer program is stored on the computer-readable storage medium, the computer-readable storage medium include electrically erasable programmable read-only memory; and the computer program is executed by a processor to realize the video processing method according to claim 1.

8. The electronic device according to claim 6, wherein the step of determining the model structure of the encoding network model based on the sequence characteristics corresponding to the original video sequence and/or the first performance of the encoding network model comprises:

determining at least one adjacent frame in the original video sequence with a frame difference value greater than a frame difference threshold; and adding learning parameters in a network layer corresponding to the at least one adjacent frame.

9. The electronic device according to claim 6, wherein before inputting the implicit representation video parameters into the reconstruction network model to obtain the reconstructed video sequence corresponding to the original video sequence, the video processing method further comprises:

determining a model structure of the reconstruction network model based on video information corresponding to each of the plurality of image blocks or based on a second performance corresponding to the reconstruction network model or based on video information corresponding to each of the plurality of image blocks and a second performance corresponding to the reconstruction network model.

10. The electronic device according to claim 6, wherein a model structure of the reconstruction network model is determined based on video information corresponding to each of the plurality of image blocks and/or a second performance corresponding to the reconstruction network model by:

adding a second middle layer group of the reconstructed network model, wherein the second middle layer group is used to execute an iterative process, and an input of the second middle layer group is consistent;

or deepening at least one third intermediate layer of the reconstructed network model;

or widening at least one fourth intermediate layer of the reconstructed network model;

or adding a second middle layer group of the reconstructed network model, wherein the second middle layer group is used to execute an iterative process, and an input of the second middle layer group is consistent; and deepening at least one third intermediate layer of the reconstructed network model;

or adding a second middle layer group of the reconstructed network model, wherein the second middle layer group is used to execute an iterative process, and an input of the second middle layer group is consistent; and widening at least one fourth intermediate layer of the reconstructed network model;

or deepening at least one third intermediate layer of the reconstructed network model; and widening at least one fourth intermediate layer of the reconstructed network model;

or adding a second middle layer group of the reconstructed network model, wherein the second middle layer group is used to execute an iterative process, and an input of the second middle layer group is consistent; and deepening at least one third intermediate layer of the reconstructed network model; and widening at least one fourth intermediate layer of the reconstructed network model; and calculating first order edge information and second order curvature information corresponding to the plurality of image blocks, and adding the first order edge information and the second order curvature information corresponding to the plurality of image blocks to a network layer corresponding to the plurality of image blocks.

11. The computer-readable storage medium according to claim 7, wherein the step of determining the model structure of the encoding network model based on the sequence characteristics corresponding to the original video sequence and/or the first performance of the encoding network model comprises:

determining at least one adjacent frame in the original video sequence with a frame difference value greater than a frame difference threshold; and adding learning parameters in a network layer corresponding to the at least one adjacent frame.

12. The computer-readable storage medium according to claim 7, wherein before inputting the implicit representation video parameters into the reconstruction network model to obtain the reconstructed video sequence corresponding to the original video sequence, the video processing method further comprises:

determining a model structure of the reconstruction network model based on video information corresponding to each of the plurality of image blocks or based on a second performance corresponding to the reconstruction network model or based on video information corresponding to each of the plurality of image blocks and a second performance corresponding to the reconstruction network model.

* * * * *